United States Patent
Iino et al.

(10) Patent No.: US 10,907,668 B2
(45) Date of Patent: Feb. 2, 2021

(54) FLOW DAMPER, PRESSURE-ACCUMULATION AND WATER-INJECTION APPARATUS, AND NUCLEAR INSTALLATION

(71) Applicant: MITSUBISHI HEAVY INDUSTRIES, LTD., Tokyo (JP)

(72) Inventors: Masamichi Iino, Tokyo (JP); Shigeto Hirai, Tokyo (JP); Taiki Asahara, Tokyo (JP); Takafumi Ogino, Tokyo (JP); Akira Kirita, Tokyo (JP); Akihiro Toda, Tokyo (JP); Hideyuki Sakata, Tokyo (JP); Yutaka Tanaka, Tokyo (JP); Setsuo Tokunaga, Tokyo (JP); Takashi Nakahara, Tokyo (JP); Takanori Okazaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 421 days.

(21) Appl. No.: 15/748,365

(22) PCT Filed: Jan. 27, 2017

(86) PCT No.: PCT/JP2017/002927
§ 371 (c)(1),
(2) Date: Jan. 29, 2018

(87) PCT Pub. No.: WO2017/138375
PCT Pub. Date: Aug. 17, 2017

(65) Prior Publication Data
US 2018/0358137 A1  Dec. 13, 2018

(30) Foreign Application Priority Data
Feb. 9, 2016  (JP) .................................. 2016-022400

(51) Int. Cl.
| F15D 1/00 | (2006.01) |
| G21C 15/18 | (2006.01) |
| G21C 15/243 | (2006.01) |

(52) U.S. Cl.
CPC ........... *F15D 1/0015* (2013.01); *G21C 15/18* (2013.01); *G21C 15/243* (2013.01); *Y02E 30/30* (2013.01)

(58) Field of Classification Search
CPC ............................. F15D 1/009; F15D 1/0015
(Continued)

(56) References Cited

U.S. PATENT DOCUMENTS

| 4,021,298 A | 5/1977 | Jones |
| 4,072,559 A | 2/1978 | Neidl et al. |

(Continued)

FOREIGN PATENT DOCUMENTS

| JP | 63-19597 A | 1/1988 |
| JP | 4-328494 A | 11/1992 |

(Continued)

OTHER PUBLICATIONS

International Search Report dated Mar. 28, 2017, issued in Counterpart of International Application No. PCT/JP2017/002927 (2 pages).

*Primary Examiner* — Sharon M Davis
(74) *Attorney, Agent, or Firm* — Westerman, Hattori, Daniels & Adrian, LLP

(57) ABSTRACT

A flow damper including a cylindrical vortex chamber, a small flow-rate pipe connected to a peripheral plate of the vortex chamber along a tangential direction, a large flow-rate pipe connected to the peripheral plate with a predetermined angle with respect to the small flow-rate pipe, an outlet pipe connected to an outlet formed in a central part of the vortex chamber, and a pressure equalization pipe with (Continued)

respective ends being connected to the peripheral plate on opposite sides of the outlet and at positions closer to a connection portion between the small flow-rate pipe and the large flow-rate pipe than positions facing each other, putting the outlet therebetween. The pressure equalization pipe is arranged with at least a part thereof is located at a higher position than a top plate of the vortex chamber, and an outgassing hole is provided at an uppermost part of the pressure equalization pipe.

6 Claims, 11 Drawing Sheets

(58) Field of Classification Search
USPC .......................................... 137/808, 812, 813
See application file for complete search history.

(56) References Cited

U.S. PATENT DOCUMENTS

| | | | |
|---|---|---|---|
| 4,158,637 A | 6/1979 | Jones | |
| 4,668,465 A | 5/1987 | Boomgaard et al. | |
| 4,762,670 A | 8/1988 | Yoshida et al. | |
| 4,786,464 A | 11/1988 | Bardot | |
| 4,851,183 A | 7/1989 | Hampel | |
| 4,851,186 A | 7/1989 | Berte et al. | |
| 5,309,488 A | 5/1994 | Matsuoka | |
| 5,623,109 A | 4/1997 | Uchida et al. | |
| 5,817,958 A | 10/1998 | Uchida et al. | |
| 7,522,693 B2 | 4/2009 | Eoh et al. | |
| 7,757,715 B2 | 7/2010 | Shiraishi | |
| 7,881,421 B2* | 2/2011 | Shiraishi | G21C 15/18 376/282 |
| 8,070,892 B2 | 12/2011 | Jeong et al. | |
| 8,670,518 B2 | 3/2014 | Eoh et al. | |
| 9,099,205 B2 | 8/2015 | Park et al. | |
| 2008/0121300 A1* | 5/2008 | Shiraishi | G21C 15/18 137/833 |
| 2009/0180581 A1 | 7/2009 | Shiraishi | |
| 2009/0268860 A1 | 10/2009 | Lu | |
| 2012/0281802 A1 | 11/2012 | Niida | |
| 2013/0294560 A1 | 11/2013 | Graham | |
| 2015/0187445 A1 | 7/2015 | Kim et al. | |
| 2016/0042816 A1 | 2/2016 | Yi et al. | |

FOREIGN PATENT DOCUMENTS

| | | |
|---|---|---|
| JP | 5-256982 A | 10/1993 |
| JP | 62-184499 U | 11/1997 |
| JP | 10-148692 A | 6/1998 |
| JP | 4533957 B2 | 9/2010 |
| WO | 2008/065889 A1 | 6/2008 |
| WO | 2011/114782 A1 | 9/2011 |

* cited by examiner

FLOW DAMPER, PRESSURE-ACCUMULATION AND WATER-INJECTION APPARATUS, AND NUCLEAR INSTALLATION

FIELD

The present invention relates to a flow damper that statically performs switching of a water-injection flow rate from a large flow rate to a small flow rate, a pressure-accumulation and water-injection apparatus including therein the flow damper, and a nuclear installation including the pressure-accumulation and water-injection apparatus.

BACKGROUND

Generally, there is a type of pressure-accumulation and water-injection apparatus that includes a tank (an airtight container) for storing water (coolant) therein, in which the stored water is pressurized by pressurized gas enclosed in an upper part of the tank. The pressure-accumulation and water-injection apparatus includes in the tank, a flow damper that can perform switching of a water-injection flow rate to a nuclear reactor from a large flow rate to a small flow rate statically (without using a movable portion). The pressure-accumulation and water-injection apparatus including such a flow damper is used, for example, as a nuclear reactor-internal cooling facility for emergency of a nuclear installation including a pressurized water nuclear reactor (PWR).

As be flow damper of the pressure-accumulation and water-injection apparatus, there has been conventionally known a flow damper that includes a cylindrical vortex chamber, a small flow-rate pipe connected to a peripheral edge of the vortex chamber along a tangential direction thereof, a large flow-rate pipe connected to the peripheral edge with a predetermined angle with respect to the small flow-rate pipe, and an outlet pipe connected to an outlet formed in a central part of the vortex chamber (see Patent Literature 1).

In this type of flow damper, inlets of the small flow-rate pipe and the large flow-rate pipe are respectively open in the tank of the pressure-accumulation and water-injection apparatus, and the small flow-rate pipe is provided such that an inlet height thereof is lower than that of the large flow-rate pipe. In the pressure-accumulation and water-injection apparatus, if a water level in the tank is low and below an inlet position of the large flow-rate pipe, water flows into the cylindrical vortex chamber only from the small flow-rate pipe, to form a swirling flow that flows along an inner periphery of the vortex chamber, and flows out from the outlet in a state where outflow resistance is high. Therefore, a water-injection flow rate of water injected from the outlet to the nuclear reactor becomes low. On the other hand, if the water level in the tank of the pressure-accumulation and water-injection apparatus is high and exceeds the inlet position of the large flow-rate pipe, water flows into the vortex chamber from both the small flow-rate pipe and the large flow-rate pipe. In this case, jets from the small flow-rate pipe and from the large flow-rate pipe impinge on each other in the vortex chamber, and the impinging jets form a non-swirling flow that flows straight toward the outlet. Therefore, the outflow resistance becomes low and the water-injection flow rate of water injected from the outlet to the nuclear reactor becomes higher than an increase of an inflow sectional area into the vortex chamber.

However, in the flow damper described above, if there is a manufacturing error in the size of the vortex chamber, the small flow-rate pipe, or the large flow rate pipe or there is a disturbance in the water flow flowing into the vortex chamber, the pressure (flow rate) of the jet respectively flowing from the small flow-rate pipe and the large flow-rate pipe is imbalanced. Therefore, the impinging jets of the respective jets flow to a direction deviated from the outlet to form a swirling flow, and thus the outflow resistance may increase to cause a problem in which a necessary flow rate cannot be acquired.

To solve this problem, conventionally, there has been proposed a flow damper in which two openings are provided in a peripheral edge of a vortex chamber and a pressure equalizing passage (a pressure equalizing pipe) for communicating between these openings is formed (see Patent Literature 2). In this configuration, even if the pressure (flow rate) of the jet respectively flowing from a small flow-rate pipe and a large flow-rate pipe is imbalanced, the pressure equalizing pipe offsets the pressure difference, thereby enabling to prevent a decrease of the water-injection flow rate.

CITATION LIST

Patent Literature

Patent Literature 1: Japanese Patent No. 4533957 B.
Patent Literature 2: Japanese Patent Application Laid-open No. H10-148692 A

SUMMARY

Technical Problem

However, according to the conventional configurations, if air is mixed in a vortex chamber, the air is accumulated in a pressure equalization pipe and the effect of offsetting a pressure difference cannot be fully acquired, and it may become difficult to inject water with a required flow rate.

The present invention has been achieved in view of the above problems, and an object of the present invention is to provide a flow damper that can perform water injection with a required flow rate while acquiring the effect of a pressure equalization pipe sufficiently, and a pressure-accumulation and water-injection apparatus and a nuclear installation.

Solution to Problem

To achieve the above object, a flow damper according to the present invention includes a cylindrical vortex chamber, a first inlet pipe connected to a peripheral edge of the vortex chamber along a tangential direction thereof, a second inlet pipe connected to the peripheral edge with a predetermined angle with respect to the first inlet pipe, an outlet pipe connected to an outlet formed in a central part of the vortex chamber, and a pressure equalization pipe with respective ends being connected to the peripheral edge located on opposite sides of the outlet. The pressure equalization pipe is arranged such that at least a part of the pressure equalization pipe is located at a higher position than a top surface of the vortex chamber, and an outgassing hole is provided at an uppermost part of the pressure equalization pipe.

According to the flow damper, because the pressure equalization pipe is arranged such that at least a part thereof is located at a higher position than the top surface of the vortex chamber, gas having flowed into the vortex chamber can be collected in the pressure equalization pipe. Further, because the outgassinq hole is provided at the uppermost part of the pressure equalization pipe, the collected gas flows out through the hole. As a result, the effect of offsetting the pressure difference by the pressure equalization pipe can be acquired sufficiently, and water injection can be performed with a required flow rate.

Further, in the flow damper according to the present invention, the pressure equalization pipe is arranged to pass above the top plate of the vortex chamber. According to this configuration, it is possible to prevent that the pressure equalization pipe passing the side of the peripheral edge of the vortex chamber or below a bottom surface thereof. Therefore, for example, when the flow damper is arranged in the airtight container of the pressure-accumulation and water-injection apparatus, interference between the pressure equalization pipe and a bottom end plate of the airtight container can be suppressed, and the flow damper can be arranged at the lowest position of the airtight container. Accordingly, water in the airtight container can be used for water injection without wasting the water.

Further, in the flow damper according to the present invention, the pressure equalization pipe includes a liquid-inflow prevention unit that suppresses inflow of liquid from outside of the pressure equalization pipe to an inner space thereof in the hole. According to this configuration, for example, when water injection is performed by the flow damper through the outlet pipe, it is possible to prevent that the water (liquid) in the airtight container flowing into the inner space of the pressure equalization pipe through the hole. Therefore, water injection can be performed with a required flow rate without degrading the effect of offsetting the pressure difference by the pressure equalization pipe.

Further, in the flow damper according to the present invention, the liquid-inflow prevention unit is a check valve including a valve element that closes the hole by flow of liquid from outside of the pressure equalization pipe to an inner space thereof. According to this configuration, because the valve element closes the hole by the flow of liquid from outside of the pressure equalization pipe to the inner space, power for activating the valve element is not required, and inflow of liquid from outside of the pressure equalization pipe to the inner space can be prevented with a simple configuration.

Further, in the flow damper according to the present invention, the liquid-inflow prevention unit is a membrane member that allows circulation of gas to the hole and prevents circulation of liquid to the hole. According to this configuration, gas accumulated in the pressure equalization pipe can be caused to flow to outside and inflow of liquid from outside of the pressure equalization pipe into the inner space can be prevented, with a simple configuration of covering the hole with the membrane member.

To achieve the above object, a pressure-accumulation and water-injection apparatus according to the present invention includes an airtight container capable of storing therein cooling water in a pressurized state, and the flow damper according to at least one described above that is arranged in the airtight container in a mode in which the outlet pipe is pulled out to outside of the airtight container.

According to the pressure-accumulation and water-injection apparatus, when cooling water is stored in the airtight container in a pressurized state, even if gas is mixed in the vortex chamber of the flow damper, the gas can be collected in the pressure equalization pipe. Further, because the outgassinq hole is provided in the uppermost part of the pressure equalization pipe, the collected gas flows to outside through the hole. As a result, the effect of offsetting the pressure difference by the pressure equalization pipe can be acquired sufficiently, and waver injection can be performed with a required flow rate.

To achieve the above object, a nuclear installation according to the present invention generates a high-temperature fluid by heat generated in a nuclear reactor and uses the high-temperature fluid by feeding the high-temperature fluid through a coolant pipe. The outlet pipe pulled out to outside of the airtight container in the pressure-accumulation and water-injection apparatus described above is connected to middle of the coolant pipe leading to the nuclear reactor, and a valve is provided in middle of the outlet pipe.

According to the nuclear installation, when water injection to the nuclear reactor is required and when cooling water stored in the airtight container in a pressurized state is injected to the outside of the airtight container from the outlet pipe via the flow damper, even if gas is mixed in the vortex chamber of the flow damper, the gas can be collected in the pressure equalization pipe. Further, because the outgassing hole is provided in the uppermost part of the pressure equalization pipe, the collected gas flows to outside through the hole. As a result, the effect of offsetting the pressure difference by the pressure equalization pipe can be acquired sufficiently, and water injection can be performed with a required flow rate.

Advantageous Effects of Invention

According to the present invention, because a pressure equalization pipe is arranged such that at least a part thereof is located at a higher position than a top surface of a vortex chamber, gas having flowed into a vortex chamber can be collected in the pressure equalization pipe. Further, because an outgassing hole is provided at the uppermost part of the pressure equalization pipe, the collected gas flows out through the hole. As a result, the effect of offsetting a pressure difference by the pressure equalization pipe can be acquired sufficiently, and water injection can be performed with a required flow rate.

DESCRIPTION OF EMBODIMENTS

An embodiment of the present invention will be described in detail below with reference to the accompanying drawings. The present invention is not limited to the embodiment. Further, constituent elements according to the following embodiment include those that can be easily replaced by persons skilled in the art or that are substantially the same.

Figure 1:
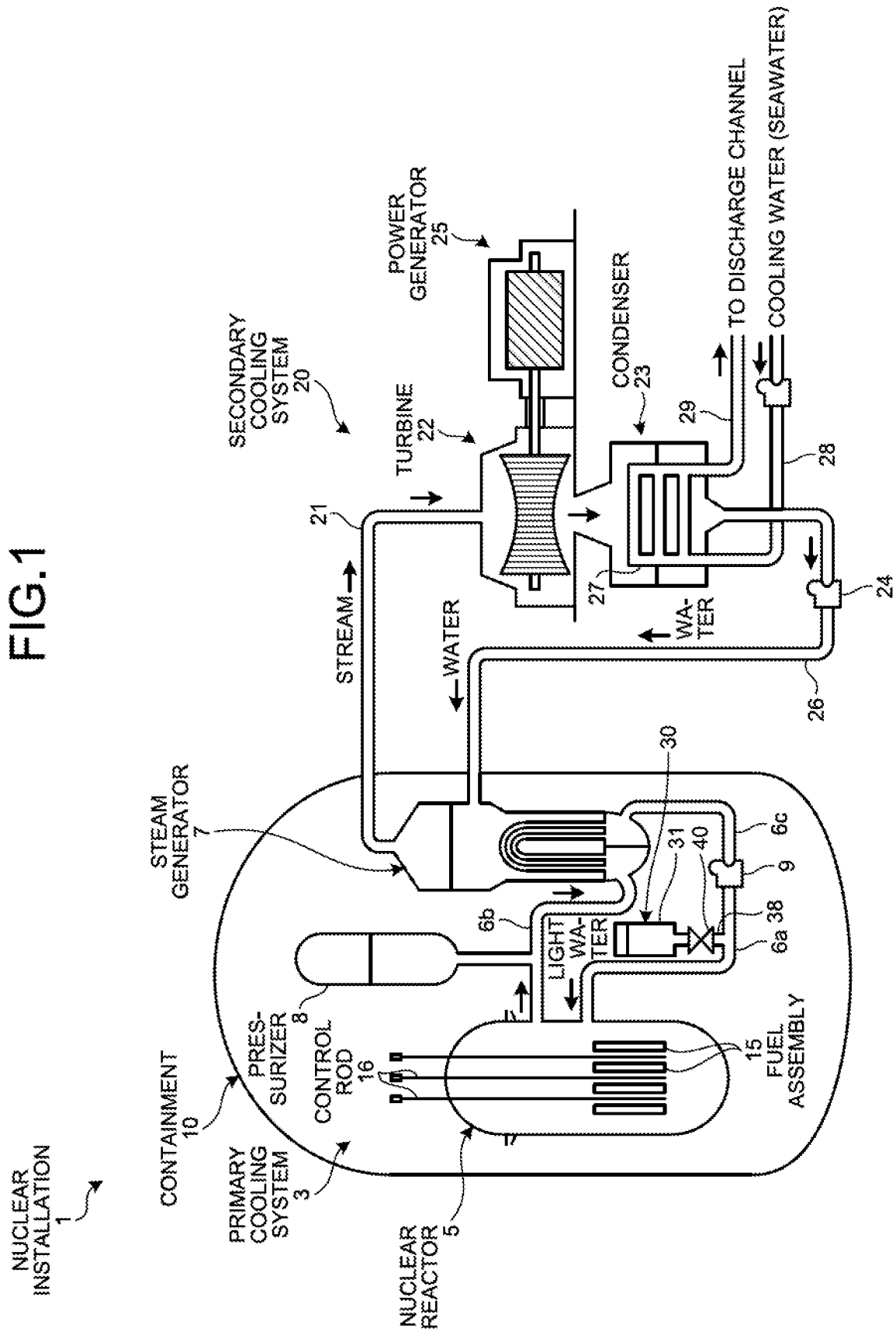
FIG. 1 is a schematic configuration diagram of an example of a nuclear installation according to an embodiment of the present invention.

FIG. 1 is a schematic configuration diagram of an example of a nuclear installation according to the present embodiment. As illustrated in FIG. 1, in a nuclear installation 1, a pressurized water nuclear reactor (PWR) is used as a nuclear reactor 5. In the nuclear installation 1, after a primary coolant is heated in the nuclear reactor 5, the primary coolant (water, liquid) being a high-temperature fluid that has become a high temperature is fed to a steam generator 7 by a coolant pump 9. In the nuclear installation 1, the high-temperature primary coolant is heat-exchanged with a secondary coolant to evaporate the secondary coolant in the steam generator 7, and the evaporated secondary coolant (steam) is fed to a turbine 22 to drive a power generator 25, thereby performing power generation. The primary coolant is light water to be used as a coolant and a neutron moderator.

The nuclear installation 1 includes the nuclear reactor 5 and the steam generator 7 connected to the nuclear reactor 5 via coolant pipes 6a, 6b, and 6c, which are formed of a cold leg 6a crossover leg 6c, and a hot leg 6b. A pressurizer 8 is interposed in the hot leg 6b. Further, the coolant pump 9 is interposed between the cold leg 6a and the crossover leg 6c. A primary cooling system 3 of the nuclear installation 1 is configured by the nuclear reactor 5, the coolant pipes 6a, 6b, and 6c, the steam generator 7, the pressurizer 8, and the coolant pump 9, and these elements are accommodated in a containment 10. Although not illustrated in the drawings, the steam generator 7 is provided in plural, and each of the steam generators 7 is connected to the nuclear reactor 5 via the coolant pipes 6a, 6b, and 6c provided in a pair respectively.

The nuclear reactor 5 is a pressurized-water nuclear reactor as described above, and the inside thereof is filled with a primary coolant. The nuclear reactor 5 accommodates therein a large number of fuel assemblies 15 filled with the primary coolant. In the nuclear reactor 5, a large number of control rods 16 that control nuclear fission of the fuel assemblies 15 are provided so as to be able to be inserted in each of the fuel as 15. When the fuel assembly 15 undergoes fission while fission reaction is controlled by the control rods 16 and boron concentration in the primary coolant, thermal energy is generated by the nuclear fission. The generated thermal energy heats the primary coolant and the heated primary coolant becomes a high temperature fluid.

The pressurizer 8 interposed in the hot leg 6b pressurizes the high-temperature primary coolant to suppress boiling of the primary coolant. The steam generator 7 causes the high-temperature and high-pressure primary coolant to perform heat-exchange with the secondary coolant, thereby evaporating the secondary coolant to generate steam, and cooling the high-temperature and high-pressure primary coolant. The coolant pump 9 circulates the primary coolant in the primary cooling system 3, and feeds the primary coolant from the steam generator 7 to the nuclear reactor 5 via the cold leg 6a and the crossover leg 6c, and feeds the primary coolant from the nuclear reactor 5 to the steam generator 7 via the hot leg 6b.

A series of operations in the primary cooling system 3 of the nuclear installation 1 is described here. When the primary coolant is heated by the thermal energy generated by the fission reaction in the nuclear reactor 5, the heated primary coolant is fed to the steam generator 7 by the respective coolant pumps 9 via the hot leg 6b. The high-temperature primary coolant passing through the hot leg 6b is pressurized by the pressurizer 8 to suppress boiling, and flows into the steam generator 7 in a high-temperature and high-pressure state. The entire primary coolant system is pressurized by the pressurizer 8 to suppress boiling also in the nuclear reactor 5, which is a heating portion. The high-temperature and high-pressure primary coolant having flowed into the steam generator 7 is cooled by performing heat-exchange with the secondary coolant, and the cooled primary coolant is fed by the coolant pump 9 to the nuclear reactor 5 via the cold leg 6a. The cooled primary coolant flows into the nuclear reactor to cool the nuclear reactor 5.

The nuclear installation 1 includes the turbine 22 connected to the steam generator 7 via a steam pipe 21, a condenser 23 connected to the turbine 22, a feed-water pump 24 interposed in a feed-water pipe 26 that connects between the condenser 23 and the steam generator 7, and a secondary cooling system 20 is configured by these units. The secondary coolant that circulates in the secondary cooling system 20 evaporates in the steam generator 7 to become gas (steam), and is returned from gas to liquid in the condenser 23. The power generator 25 is connected to the turbine 22.

A series of operations in the secondary cooling system 20 of the nuclear installation 1 is described here. When steam flows into the turbine 22 from each of the steam generators 7 via the steam pipe 21, the turbine 22 rotates. When the turbine 22 rotates, the power generator 25 connected to the turbine 22 generates power. Thereafter, steam having flowed out from the turbine 22 flows into the condenser 23. A cooling pipe 27 is arranged in the condenser 23. An intake pipe 28 to supply cooling water (for example, seawater) is connected to one side of the cooling pipe 27, and a discharge pipe 29 to discharge cooling water is connected to the other side of the cooling pipe 27. The condenser 23 cools the steam flowing from the turbine 22 by the cooling pipe 27 to return the steam to the liquid. The secondary coolant being in a liquid form is fed to each of the steam generators 7 by the feed-water pump 24 via the feed-water pipe 25. The secondary coolant fed to each of the steam generators 7 becomes steam again by heat-exchange with the primary coolant in the respective steam generators 7.

Meanwhile, an emergency cooling facility is provided in the nuclear installation 1 configured as described above, while assuming occurrence of a loss accident of a primary coolant. As illustrated in FIG. 1, the emergency cooling facility includes a pressure-accumulation and water-injection apparatus 30. As the emergency cooling facility, other than the pressure-accumulation and water-injection apparatus, there is exemplified an injection system using a pump.

Figure 2:
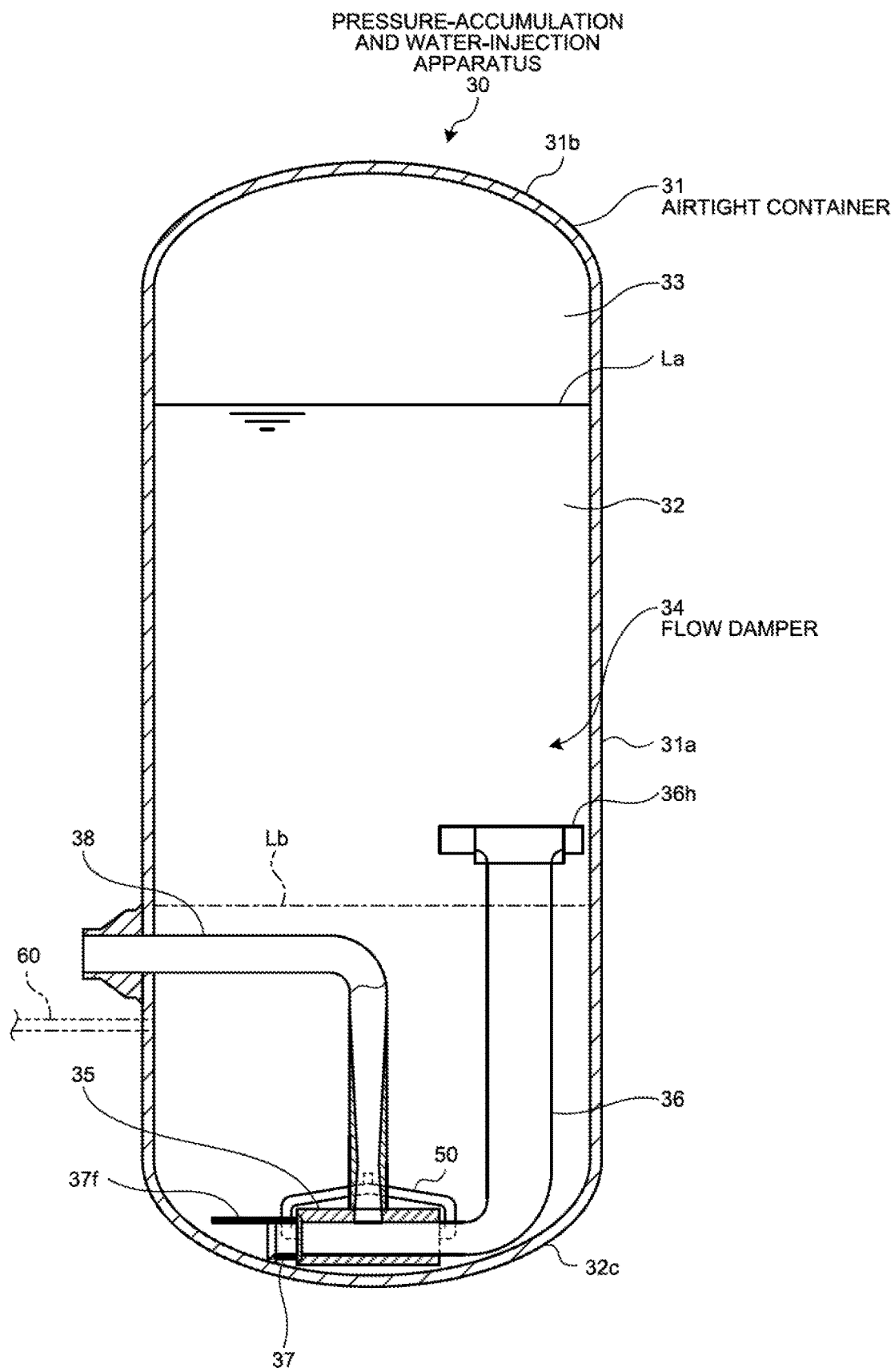
FIG. 2 is a schematic configuration diagram of a pressure-accumulation and water-injection apparatus.
Figure 3:
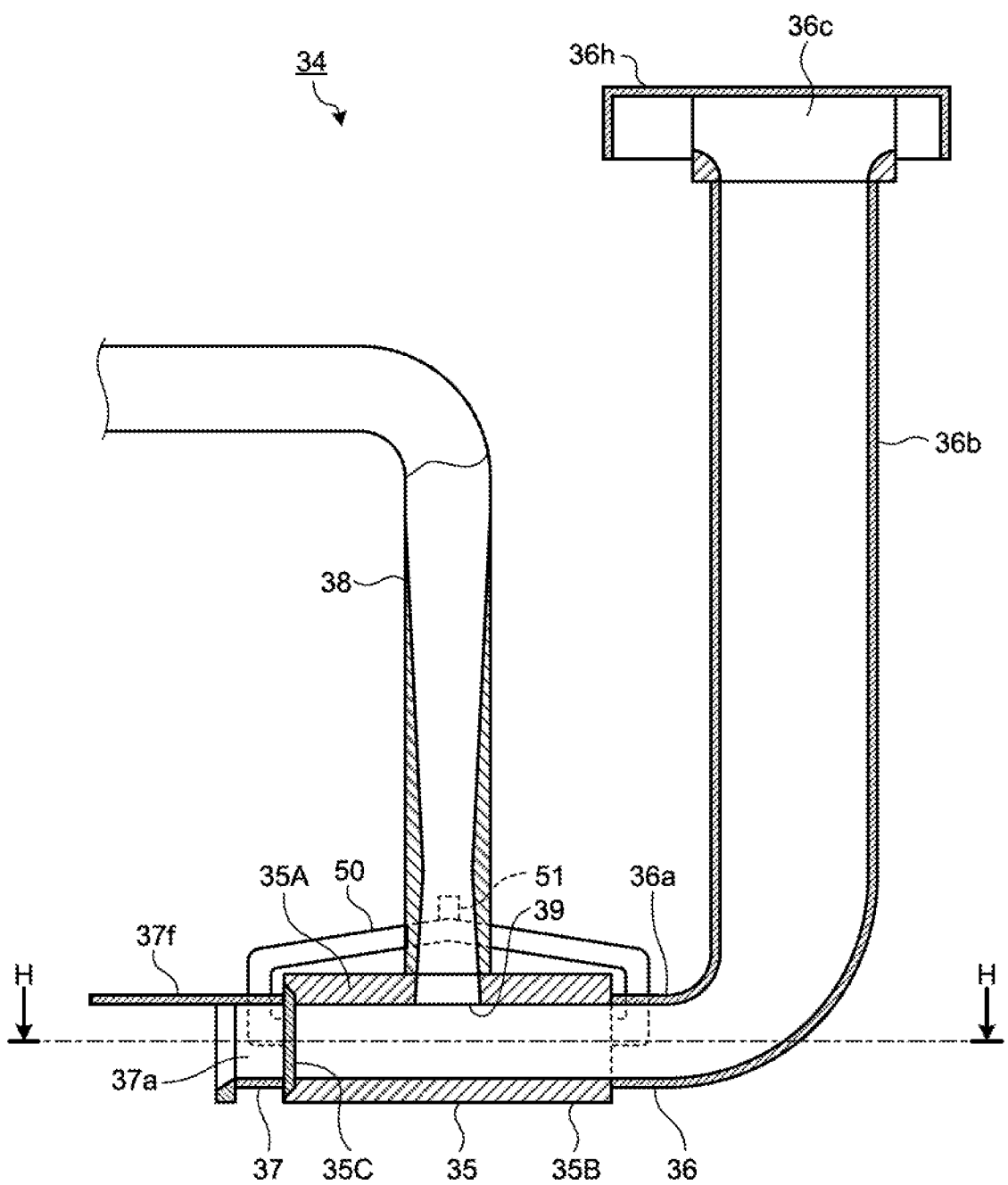
FIG. 3 is a sectional view illustrating a basic configuration of a flow damper.
Figure 4:
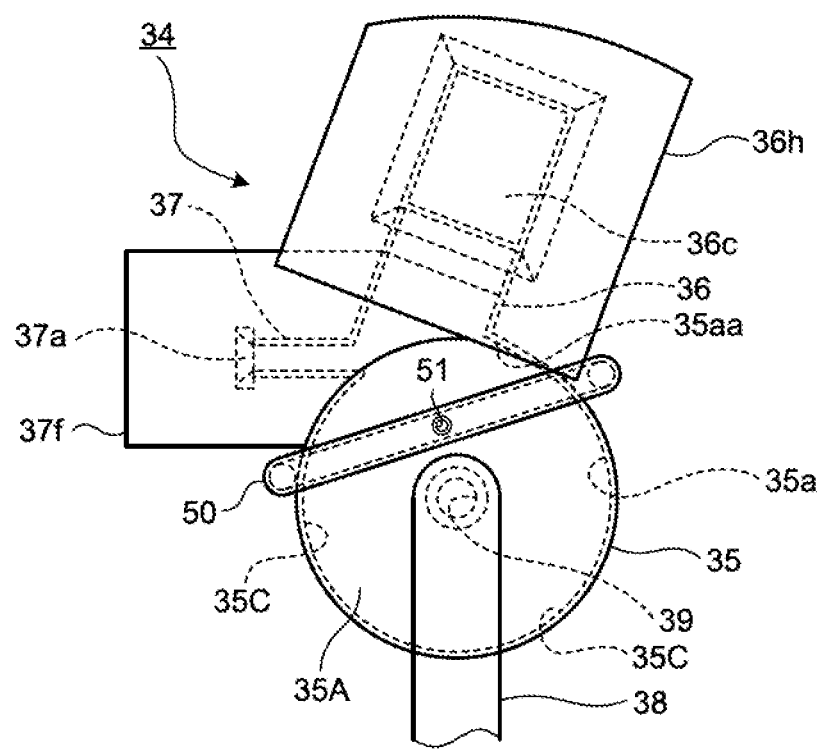
FIG. 4 is a plan view illustrating a basic configuration of the flow damper.
Figure 5:
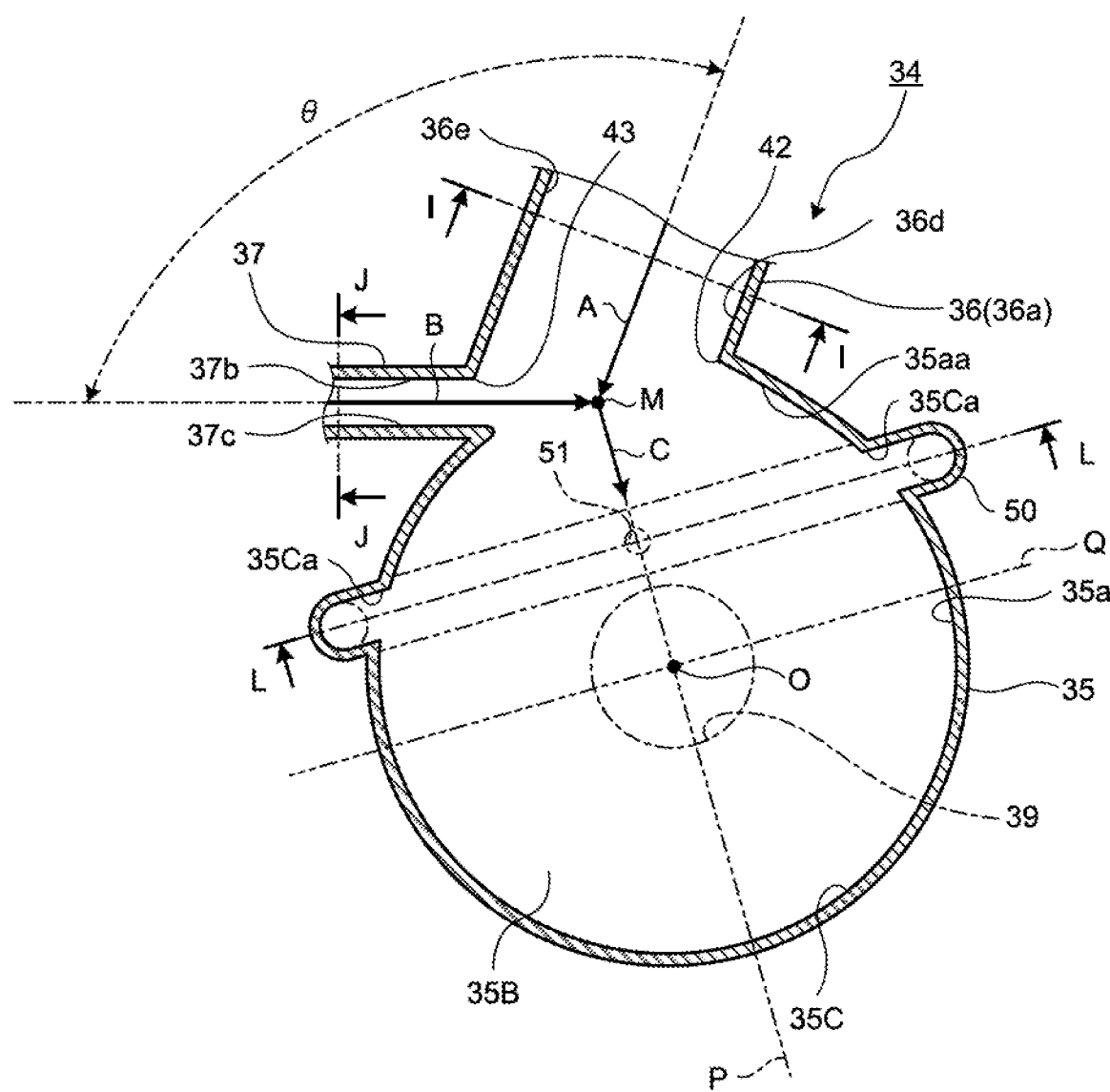
FIG. 5 is a sectional view along a line H-H in FIG. 3.
Figure 6:
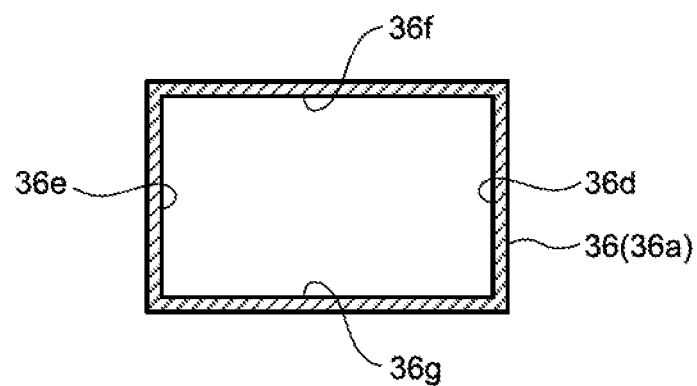
FIG. 6 is an enlarged sectional view along a line I-I in FIG. 5.
Figure 7:
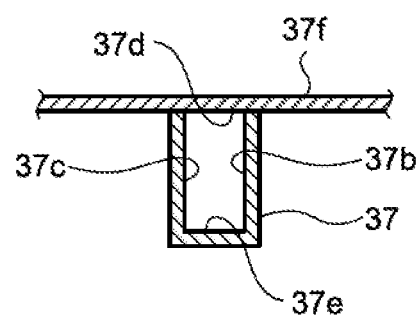
FIG. 7 is an enlarged sectional view along a line J-J in FIG. 5.
Figure 8:
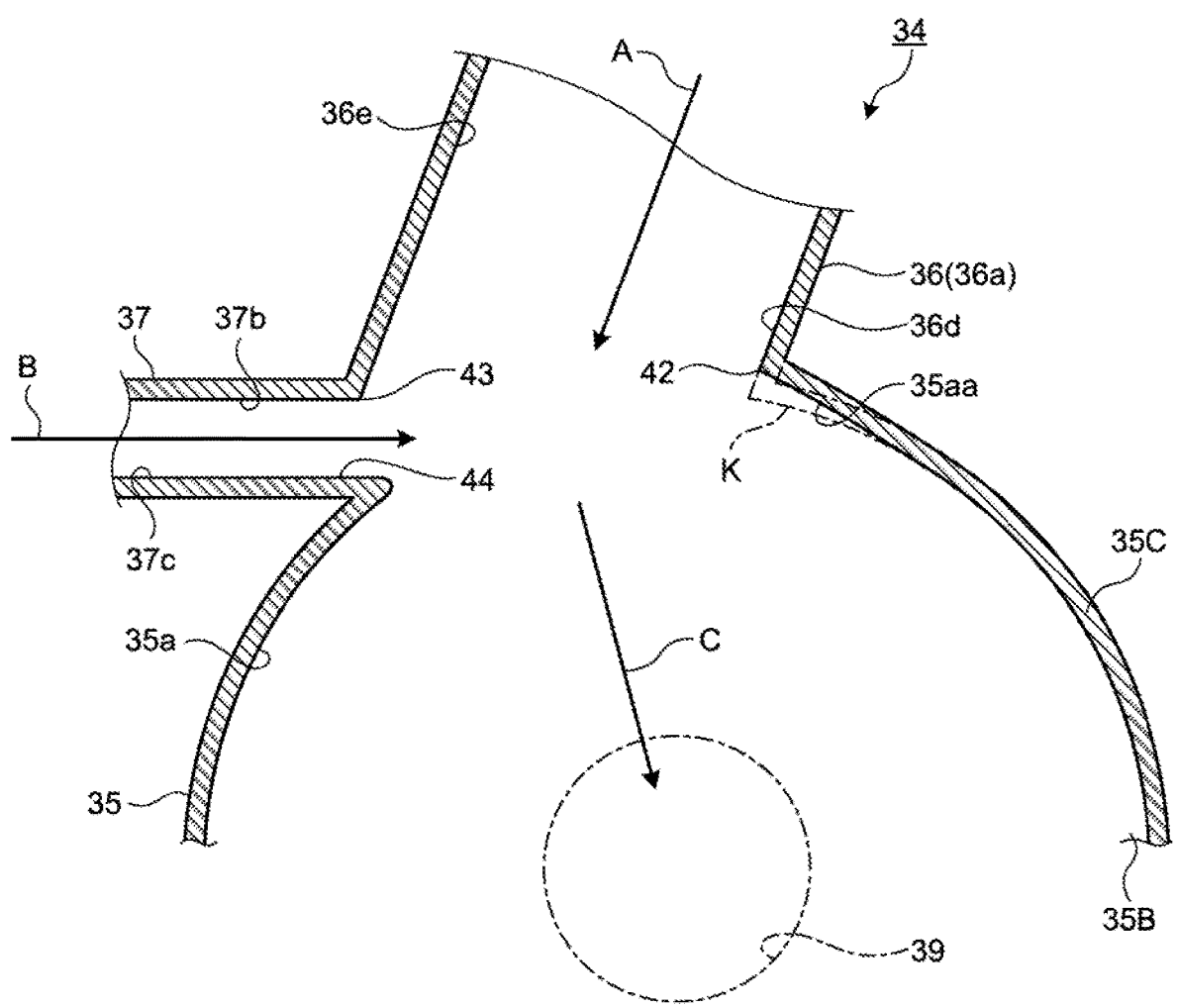
FIG. 8 is an enlarged view of relevant parts in FIG. 5.
Figure 9:
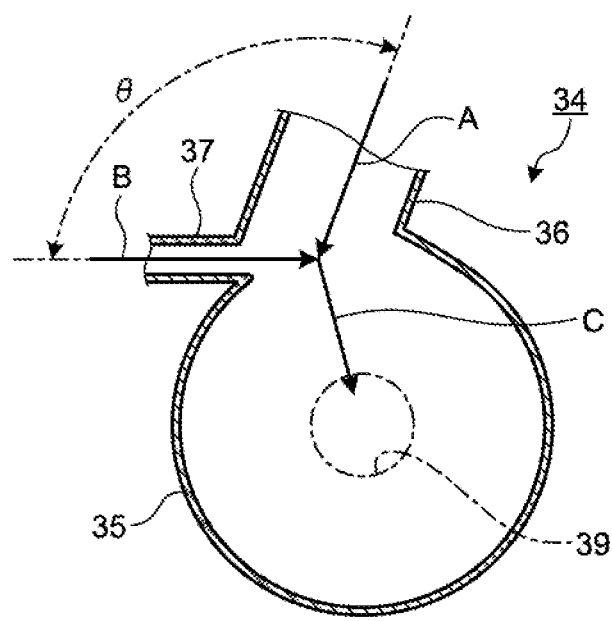
FIG. 9 is an explanatory diagram of switching of a water-injection flow rate by the flow damper.
Figure 10:
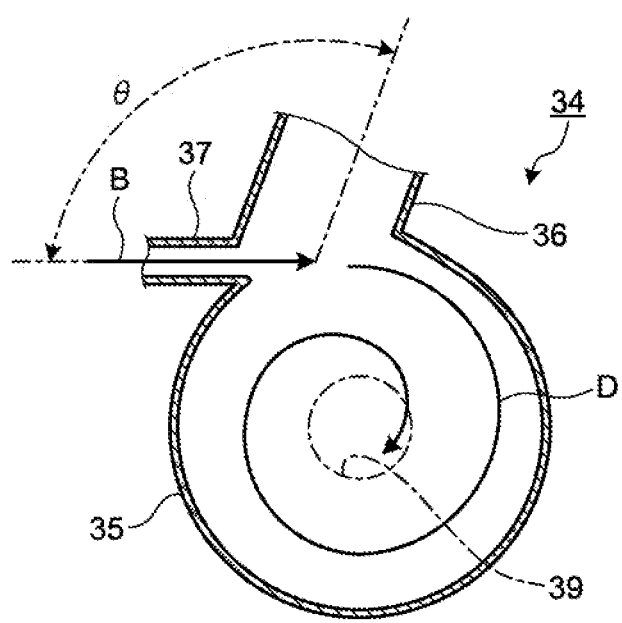
FIG. 10 is an explanatory diagram of switching of a water-injection flow rate by the flow damper.

FIG. 2 is a schematic configuration diagram of the pressure-accumulation and water-injection apparatus, FIG. 3 is a sectional view illustrating a basic configuration of a flow damper, FIG. 4 is a plan view illustrating a basic configuration of the flow damper, FIG. 5 is a sectional view along a line H-H (a cross sectional view) in FIG. 3, FIG. 6 is an enlarged sectional view (an enlarged view of a longitudinal sectional view) along a line I-I in FIG. 5, FIG. 7 is an enlarged sectional view (an enlarged view of a longitudinal sectional view) along a line J-J in FIG. 5, FIG. 8 is an enlarged view of relevant parts in FIG. 5, FIG. 9 is an explanatory diagram of switching of a water-injection flow rate by the flow damper, and FIG. 10 is an explanatory diagram of switching of a water-injection flow rate by the flow damper. In FIG. 8 to FIG. 10, a pressure equalization pipe (described later) is omitted in the flow damper.

As illustrated in FIG. 2, the pressure-accumulation and water-injection apparatus 30 includes an airtight container 31 that can store cooling water 32 therein, and a flow damper 34 arranged in the airtight container 31. The pressure-accumulation and water-injection apparatus 30 pressurizes the stored cooling water 32 and injects the pressurized cooling water to the primary cooling system 3 via the flow damper 34. The cooling water 32 is stored in the airtight container 31 and is pressurized by pressurized gas 33 enclosed in an upper part of the airtight container 31. To the airtight container 31, a top end plate 31b and a bottom end plate 31c are respectively coupled to an upper end and a lower end of a cylindrical portion 31a of the airtight container 31 by means such as welding. The flow damper 34 that can statically perform switching of a water-injection flow rate from a large flow rate to a small flow rate is arranged on an inner bottom of the bottom end plate 31c.

The flow damper 34 mainly includes a vortex chamber 35, an outlet pipe 38, a small flow-rate pipe (first inlet pipe) 37, a large flow-rate pipe (second inlet pipe) 36, and a pressure equalization pipe 50. As illustrated in FIGS. 3 to 7, by arranging a circular top plate 35A and a circular bottom plate 35B at the top and the bottom of the vortex chamber 35 and providing a peripheral plate 35C on peripheral edges thereof, the vortex chamber 35 is formed in a cylindrical shape. The side of the bottom plate 35B of the vortex chamber 35 is fixed to an inner bottom of the bottom end plate 31c of the airtight container 31.

One end of the outlet pipe 38 is connected to an outlet 39 formed at the center of a circle in the top plate 35A of the vortex chamber 35. The outlet pipe 38 is extended upward from the top plate 35A, bent in a horizontal direction in the middle, and pulled outward of the airtight container 31. As illustrated in FIG. 1, the other end of the outlet pipe 38 pulled outward of the airtight container 31 is connected to the cold leg 6a, which is a low-temperature side pipe of the primary cooling system 3. A check valve 40 to block countercurrent of the coolant from the primary cooling system 3 to the side of the airtight container 31 is provided in the outlet pipe 38 pulled outward of the airtight container 31. The outlet pipe 38 can be provided by connecting one end thereof to the outlet 39 provided at the center of the bottom plate 35B of the vortex chamber 35, and extending the outlet pipe 38 from the bottom plate 35B downward and pulling outward of the airtight container 31.

The large flow-rate pipe 36 and the small flow-rate pipe 37 are connected to a peripheral edge of the vortex chamber 35 with one end being open and the other end passing through the peripheral plate 35C of the vortex chamber 35 respectively. The large flow-rate pipe 35 and the small flow-rate pipe 37 are arranged at positions where the respective other ends thereof are closer to each other than opposite positions putting the outlet 39 therebetween. The large flow-rate pipe 36 and the small flow-rate pipe 37 extend respectively in a different direction relative to the outlet 39. Specifically, the small flow-rate pipe 37 extends in one direction along a tangential direction of the peripheral plate 35C (a peripheral edge) of the vortex chamber 35 (the left direction side in FIGS. 3 and 5), and the large flow-rate pipe 36 (a horizontal portion 36a thereof) extends in the other direction (the right direction side in FIGS. 3 and 5) in the state of having a predetermined angle θ with respect to the small flow-rate pipe 37.

Cross sections of flow channels of the large flow-rate pipe 36 and the small flow-rate pipe 37 are both in a rectangle shape. That is, as illustrated in FIG. 6, the large flow-rate pipe 36 (the horizontal portion 36a) includes a pair of parallel inner surfaces (vertical surfaces) 36d and 36e facing each other in the horizontal direction, and a pair of parallel inner surfaces (horizontal surfaces) 36f and 36g facing each other in a vertical direction. Meanwhile, as illustrated in FIG. 7, the small flow-rate pipe 37 includes a pair of parallel inner surfaces (vertical surfaces) 37b and 37c facing each other in the horizontal direction, and a pair of parallel inner surfaces (horizontal surfaces) 37d and 37e facing each other in the vertical direction. Heights of the cross sections of the flow channels of the large flow-rate pipe 36 and the small flow-rate pipe 37 (heights of the inner surfaces 36d and 36e, and the inner surfaces 37b and 37c) are the same as the height of an inner periphery 35a of the vortex chamber 35 respectively. Further, in the large flow-rate pipe 36 and the small flow-rate pipe 37, the width of the cross section of the flow channel of the large flow-rate pipe 36 (widths of the inner surfaces 36f and 36g) is larger than that of the small flow-rate pipe 37 (widths of the inner surfaces 37d and 37e).

In the small flow-rate pipe 37, an inlet (an opening at one end) 37a is located at the same height as the inner periphery 35a of the vortex chamber 35. Meanwhile, the large flow-rate pipe 36 includes a stand pipe 36b connected to the horizontal portion 36a, and an inlet (an opening at one end) 36c is located on the upper side than the vortex chamber 35 or the inlet 37a of the small flow-rate pipe 37. However, a water level La of the cooling water 32 is normally located on the upper side than the inlet 36c of the large flow-rate pipe 36. A vortex baffle 36h is provided at the inlet 36c of the large flow-rate pipe 36. A vortex baffle 37f is also provided at the inlet 37a of the small flow-rate pipe 37.

As illustrated in FIGS. 5 and 8, the inner surface 37b of the small flow-rate pipe 37 on the side of the large flow-rate pipe 36 is connected to the inner surface 36e of the large flow-rate pipe 36 on the side of the small flow-rate pipe 37 at a connection portion 43. By taking into consideration an expansion of the jet from the small flow-rate pipe 37 (a ratio of expansion by a free Jet), a connection portion 42 between the inner surface 36d of the large flow-rate pipe 36 on the opposite side of the small flow-rate pipe 37 and an extension surface portion (a flat surface portion) 35a a of the inner periphery 35a of the vortex chamber 35 is located more outward than an extension line of the inner surface 37b of the small flow-rate pipe 37 on the side of the large flow-rate pipe 36 (a line extending from the connection portion 43 in the tangential direction. However, the connection portion 42 is not limited thereto, and can have a connection structure in which connection between the inner surface 36d and the inner periphery 35a does not have the extension surface portion (a flat surface portion) 35aa as indicated by a dot-and-dash line K in FIG. 8.

The inner surface 37c of the small flow-rate pipe 37 on the opposite side to the large flow-rate pipe 36 is connected to the inner periphery 35a of the vortex chamber 35 at a connection portion 44. The connection portion 44 is located on a downstream side in a flow direction of the small flow-rate pipe 37 (a jet direction: see an arrow B) with respect to the connection portion 43 described above.

The pressure-accumulation and water-injection apparatus 30 having the configuration described above has functional effects described below. For example, in the nuclear installation 1 described above, in the case where a pipe or the like of the primary cooling system 3 is broken and the primary coolant flows out from the broken part to outside of the system (that is, a loss accident of the primary coolant has occurred), the fuel assemblies 15 may be exposed from the primary coolant. If the primary coolant flows out, the pressure of the primary cooling system 3 decreases to be lower than the pressure in the airtight container 31, and the cooling water 32 in the airtight container 31 is injected from the pipe of the primary cooling system 3 into the nuclear reactor 5 via the check valve 40. Therefore, the fuel assemblies 15 are covered with water again. At this time, a water-injection flow rate to the nuclear reactor 5 is statically switched from the large flow rate to the small flow rate by the action of the flow damper 34.

That is, on the initial stage of water injection, as illustrated in FIG. 2, the water level La of the cooling water 32 in the airtight container 31 is higher than the inlet 36c of the large flow-rate pipe 36. Therefore, as indicated by arrows A and B in FIG. 9, the cooling water 32 in the airtight container 31 flows into the vortex chamber 35 from both the large flow-rate pipe 36 and the small flow-rate pipe 37. As a result, in the vortex chamber 35, influent water (jet) from the large flow-rate pipe 36 and influent water (jet) from the small flow-rate pipe 37 impinge on each other to offset each angular momentum. Therefore, these elements of influent water (impinging jet) move straight ahead toward the outlet 39 as indicated by an arrow C in FIG. 9. That is, a vortex is not formed in the vortex chamber 35 at this time. Therefore, at this time, because the flow resistance decreases at this time, the cooling water 32 flows out with a large flow rate from the outlet 39 and is injected to the nuclear reactor 5.

On the other hand, on the latter stage of water injection, as illustrated in FIG. 2, a water level Lb in the airtight container 31 decreases and becomes lower than the inlet 36c of the large flow-rate pipe 36. Therefore, as indicated by the arrow B in FIG. 10, there is no inflow of the cooling water 32 from the large flow-rate pipe 36 to the vortex chamber 35, and the cooling water 32 flows into the vortex chamber 35 only from the small flow-rate pipe 37. As a result, the influent water from the small flow-rate pipe 37 proceeds to the outlet 39 while forming vortexes (swirling flow) as indicated by an arrow D in FIG. 10. Therefore, at this time, because the flow resistance becomes high due to a centrifugal force, the flow rate of effluent water (water injection to the containment) from the outlet 39 becomes small.

On the initial stage of water injection, the nuclear reactor 5 is filled with the cooling water 32 at an early stage by performing water injection at a large flow rate, while on the stage when the fuel assemblies 15 are covered with water again on the latter stage of water injection, it is necessary to switch the flow rate of water injection from the large flow rate to the small flow rate, because water injection more than necessary causes outflow of the cooling water 32 from a broken port. The pressure-accumulation and water-injection apparatus 30 according to the present embodiment can perform switching of the flow rate of the water injection without using a dynamic device such as a pump.

Next, the pressure equalization pipe 50 is described. The flow damper 34 includes the pressure equalization pipe 50 as illustrated in FIG. 3 to FIG. 5. The pressure equalization pipe 50 is provided to resolve a pressure difference in the vortex chamber 35 of the flow damper 34 at the time of injecting water from the pressure-accumulation and water-injection apparatus 30 to the nuclear reactor 5, and performs water injection with a large flow rate required on the initial stage of water injection reliably. As illustrated in FIG. 5, communication holes 35Ca are formed in the peripheral plate 35C, which is the peripheral edge of the vortex chamber 35. The communication holes 35Ca are provided on opposite sides of the outlet 39 and at positions closer to the respective other ends (connection portions) of the small flow-rate pipe 37 and the large flow-rate pipe 36 than the positions facing each other, interposing (putting) the outlet 39 therebetween.

Specifically, in FIG. 5, when a center line Q of the vortex chamber 35 orthogonal to a center point O is set with respect to a straight line P extending from an impinging point M, at which the influent water (jet) from the large flow-rate pipe 36 indicated by the arrow A and the influent water (jet) from the small flow-rate pipe 37 indicated by the arrow B impinge on each other, to the center point O of the outlet 39, centers L of the respective communication holes 35Ca are arranged closer to the other ends of the small flow-rate pipe 37 and the large flow-rate pipe 35 than the center line Q. Further, the respective communication holes 35Ca are provided at line-symmetric positions based on the straight line P, and the respective ends of the pressure equalization pipe 50 are respectively connected to these communication holes 35Ca. That is, in the vortex chamber 35, the respective communication holes 35Ca communicate with each other by the pressure equalization pipe 50.

In this manner, the flow damper 34 communicates, with the pressure equalization pipe 50, on opposite sides in a direction in which the impinging jets of the influent water (jet) from the large flow-rate pipe 36 and the influent water (jet) from the small flow-rate pipe 37 move straight ahead toward the outlet 39 (the arrow C). Therefore, the pressure difference in the spaces on opposite sides putting the outlet 39 therebetween can be offset and the spaces can be held in a pressure equalized state. As a result, the effects of the influent water (jet) from the large flow-rate pipe 36 and the influent water (jet) from the small flow-rate pipe 37 that impinge on each other to offset each angular momentum and move straight ahead toward the outlet 39 are assisted, thereby enabling to perform water injection with the large flow rate required on the initial stage of water injection.

Figure 11:
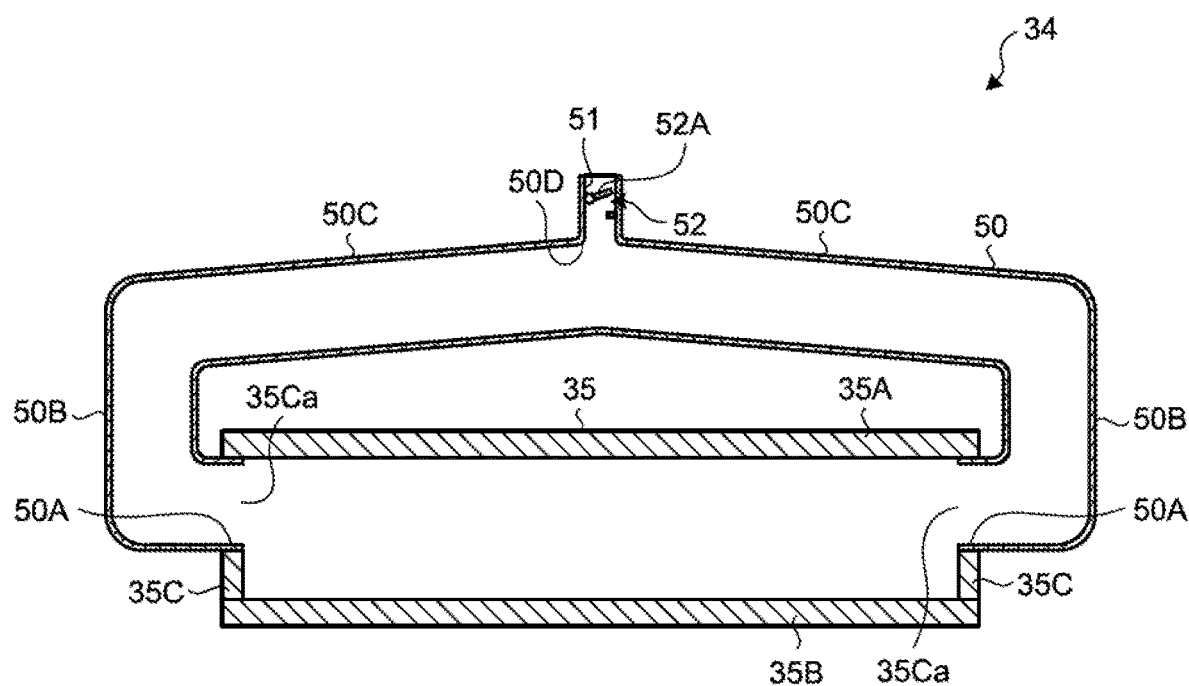
FIG. 11 is an enlarged sectional view along a line L-L in FIG. 5.

The pressure equalization pipe 50 is arranged as illustrated in FIG. 11 to pass above the top plate (top surface) 35A of the vortex chamber 35. Specifically, the pressure equalization pipe 50 includes ends 50A respectively connected to the communication holes 35Ca formed at the peripheral edge of the vortex chamber 35, first piping portions 50B respectively continuous to the ends 50A and bent vertically upward, and second piping portions 50C respectively continuous to the first piping portions 50B and bent to pass above the top plate 35A of the vortex chamber 35. The second piping portions 50C, 50C are coupled with each other above the top plate 35A to form one pressure equalization pipe 50. According to the present embodiment, the second piping portions 50C are provided to incline gradually upward from the first piping portions 50B respectively toward a coupling position thereof, and the coupling portion of the second piping portions 50C, 50C becomes an uppermost part 50D. In the pressure equalization pipe 50, the uppermost part 50D only needs to be provided at a position higher than the top plate 35A of the vortex chamber 35, and the position of the uppermost part can be changed as appropriate.

According to this configuration, because the pressure equalization pipe 50 is arranged to pass above the top plate (top surface) 35A of the vortex chamber 35, it is possible to prevent that the size of the pressure equalization pipe 50 increasing on the sides of the peripheral edge or on the lower side of the vortex chamber, as compared with a configuration in which the pressure equalization pipe passes the sides of the peripheral edge or below the bottom plate of the vortex chamber. Therefore, as illustrated in FIG. 2, when arranging the flow damper 34 in the airtight container 31 of the pressure-accumulation and water-injection apparatus 30, interference between the pressure equalization pipe 50 and a bottom end plate 31C of the airtight container 31 can be suppressed, and the flow damper 34 can be arranged at the lowest position of the airtight container 31. Accordingly, water stored in the airtight container 31 can be used effectively for water injection up to the bottom limit.

On the other hand, in the configuration in which the pressure equalization pipe 50 is arranged to pass above the top plate (top surface) 35A of the vortex chamber 35, when the cooling water 32 is stored in the airtight container 31 through a feed-water pipe 50 (FIG. 2), it is assumed that the air (gas) flowing into the vortex chamber 35 accumulates in the pressure equalization pipe 50. Therefore, the pressure equalization pipe 50 includes a hole 51 on an upper surface of a pipe wall in the uppermost part 50D. According to this configuration, because the pressure equalization pipe 50 is arranged to be located at a higher position than the top plate 35A of the vortex chamber 35, the air flowing into the vortex chamber 35 can be collected in the pressure equalization pipe 50. Further, because the hole 51 is provided in the uppermost part 50D of the pressure equalization pipe 50, the air accumulated in the pressure equalization pipe 50 can be discharged to outside through the hole 51. As a result, the effect of offsetting the pressure difference by the pressure equalization pipe 50 can be acquired sufficiently, and the flow damper 34 can perform water injection with a required flow rate to the nuclear reactor 5.

Meanwhile, at the time of water injection to the nuclear reactor 5 through the flow damper 34, the pressure in the vortex chamber 35 and in the pressure equalization pipe 50 decreases than the pressure in the airtight container 31. Therefore, due to a pressure difference between the inside of the airtight container 31 and the inside of the pressure equalization pipe 50, the cooling water 32 in the airtight container 31 (liquid outside of the pressure equalization pipe 50) flows into the inner space of the pressure equalization pipe 50 through the hole 51. In this case, the effect of offsetting the pressure difference by the pressure equalization pipe 50 may be degraded due to inflow of the cooling water into the pressure equalization pipe 50. Therefore, according to the present embodiment, a check valve (liquid-inflow prevention unit) 52 that suppresses inflow of the cooling water 32 from outside of the pressure equalization pipe 50 to the inner space is provided in the hole 51.

Figure 12:
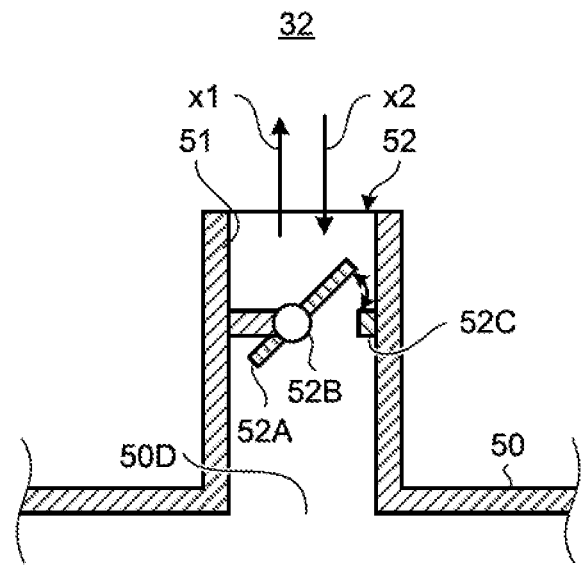
FIG. 12 is an enlarged view of relevant parts of a hole illustrating a check valve.

As illustrated in FIG. 12, the check valve 52 includes a valve element 52A, a hinge shaft 52B that becomes a rotary shaft of the valve element 52A, and a valve seat 52C that comes into contact with the valve element 52A. The valve element 52A opens the hole 51 by rotating around the hinge shaft 52B due to the flow from the inside to outside of the pressure equalization pipe 50 (an arrow X1 in FIG. 12). Further, the valve element 52A is pressed against the valve seat 52C around the hinge shaft 52B due to the flow from the outside to inside of the pressure equalization pipe 50 (an arrow X2 in FIG. 12), so as to close the hole 51. According to the check valve 52, the valve element 52A is released by the flow from the inside to outside of the pressure equalization pipe 50, thereby enabling to discharge the air in the pressure equalization pipe 50 to the outside. Further, because inflow of the cooling water 32 from the outside to inside f the pressure equalization pipe 50 is prevented, water injection with a required flow rate to the nuclear reactor 5 can be performed, without degrading the effect of offsetting the pressure difference by the pressure equalization pipe 50. Further, because the check valve 52 has a configuration in which the valve element 52A closes the hole 51 by the flow of the cooling water 32, power for activating the valve element 52A is not required, and inflow of the cooling water from outside to the inner space of the pressure equalization pipe 50 can be prevented with a simple configuration. When the valve element 52A is attached to the hinge shaft 52B, it is preferable that the valve element 52A becomes an open state at the time of watering (a state in which water is filled in the airtight container 31 and there is no flow of water) by adjusting a barycentric position of the valve element 52A. Accordingly, even if the flow from the inside to outside of the pressure equalization pipe 50 (the arrow X1 in FIG. 12) hardly occurs, the air in the pressure equalization pipe 50 can be reliably discharged.

Figure 13:
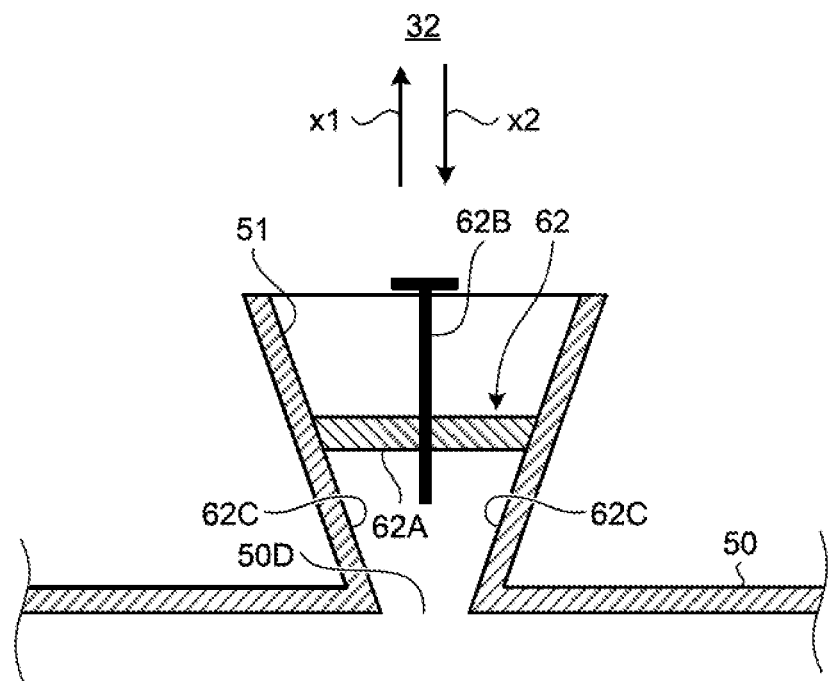
FIG. 13 is an enlarged view of relevant parts of a hole illustrating a check valve in a different mode.

The configuration of the check valve is not limited to the configuration in which a valve element is rotated around the hinge shaft described above. For example, as illustrated in FIG. 13, a check valve (liquid-inflow prevention unit) 62 of a type that opens and closes by vertically moving by the flow of the cooling water 32 can be used. The check valve 62 includes a valve element 62A in a shape of circular truncated cone, with an upper surface having an enlarged diameter than a bottom surface, and the valve element 62A has a configuration of vertically moving along a guide shaft 62B provided in a vertical direction. According to this configuration, the hole 51 is formed in a shape wish the diameter thereof being gradually increased as moving upward, and an inclined surface of the hole 51 functions as a valve seat 62C coming into contact with the valve element 62A. The valve element 62A opens the hole 51 by moving upward along the guide shaft 62B due to the flow from the inside to the outside of the pressure equalization pipe 50 (an arrow X1 in FIG. 13). Further, the valve element 52A is moved downward along the guide shaft 62B and pressed against the valve seat 62C due to the flow from the outside to inside of the pressure equalization pipe 50 (an arrow X2 in FIG. 13), to close the hole 51. Also by the check valve 62, the valve element 52A is opened by the flow from the inside to outside of the pressure equalization pipe 50, thereby enabling to discharge the air in the pressure equalization pipe 50 to the outside. Further, because inflow of the cooling water 32 from the outside to inside of the pressure equalization pipe 50 is prevented, water injection with a required flow rate to the nuclear reactor 5 can be performed, without degrading the effect of offsetting the pressure difference by the pressure equalization pipe 50. Further, because the check valve 62 has a configuration in which the valve element 62A closes the hole 51 by the flow of the cooling water 32, power for activating the valve element 62A is not required, and inflow of the cooling water from outside to the inner space of the pressure equalization pipe 50 can be prevented with a simple configuration.

Figure 14:
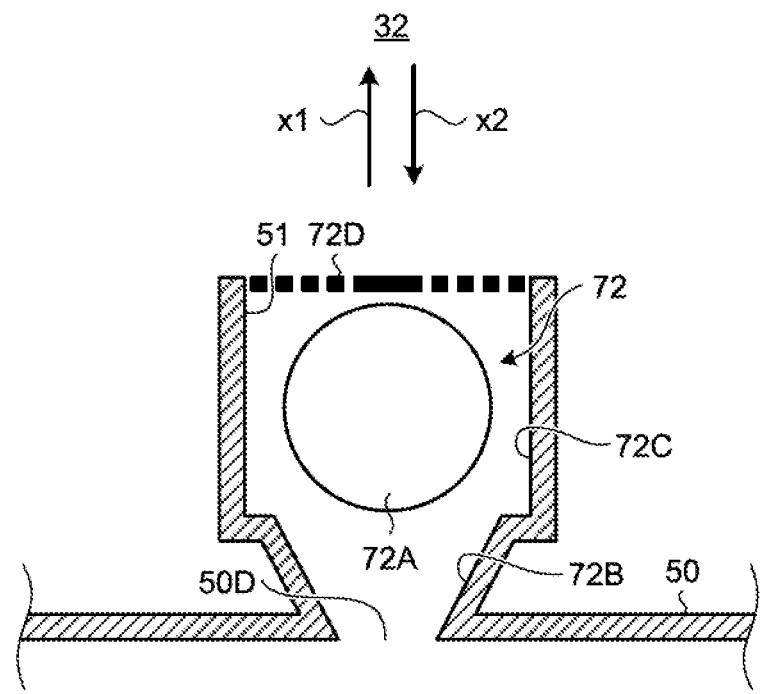
FIG. 14 is an enlarged view of relevant parts of a hole illustrating a check valve in a still different mode.

Further, a check valve 72 illustrated in FIG. 14 can be used. The check valve 72 is a vertically moving check valve similarly to the check valve 62 described above. The check valve 72 includes a spherical valve element 72A, a valve seat 72B formed in a lower part of the hole 51 and coming into contact with the valve element 72A, and a cylindrical portion 72C continuous to an upper part of the valve seat 72B to form a space in which the valve element 72A floats. An upper end opening of the cylindrical portion 72C is covered with a lid 72D formed with an opening having a size through which the spherical valve element 72A does not flow to outside. The valve element 72A floats in the cylindrical portion 72C to open the hole 51 due to the flow from the inside to outside of the pressure equalization pipe 50 (an arrow X1 in FIG. 14). Further, the valve element 72A is pressed against the valve seat 72B due to the flow from the outside to inside of the pressure equalization pipe 50 (an arrow X2 in FIG. 14) to close the hole 51. According to the check valve 72, the valve element 72A is released due to the flow from the inside to outside of the pressure equalization pipe 50, thereby enabling to discharge the air in the pressure equalization pipe 50 to the outside. Further, because inflow of the cooling water 32 from the outside to inside of the pressure equalization pipe 50 is prevented, water injection with a required flow rate to the nuclear reactor 5 can be performed, without degrading the effect of offsetting the pressure difference by the pressure equalization pipe 50. Further, because the check valve 72 has a configuration to close the hole 51 by the valve element 72A due to the flow of the cooling water 32, power for activating the valve element 72A is not required, and inflow of the cooling water from outside to the inner space of the pressure equalization pipe 50 can be prevented with a simple configuration. It is preferable that the valve element 72A has a structure in which a buoyancy force is acting, and the valve element 72A becomes an open state (floating in the cylindrical portion 72C) at the time of watering (a state in which water is filled in the airtight container 31 and there is no flow of water) by selecting the material of the valve element 72A. Accordingly, even if the flow from the inside to outside of the pressure equalization pipe 50 (the arrow X1 in FIG. 14) hardly occurs, the air in the pressure equalization pipe 50 can be discharged reliably.

Figure 15:
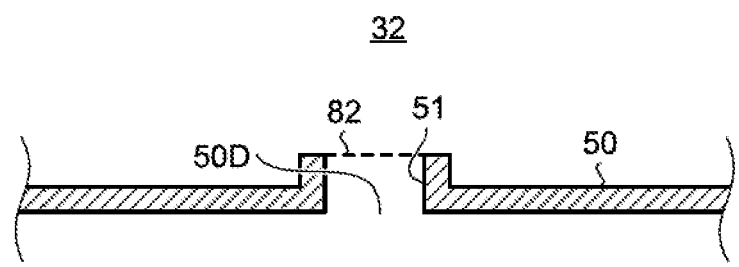
FIG. 15 is an enlarged view of relevant parts of a hole illustrating a mode in which a breathable waterproof membrane is provided.

In the configuration described above, a configuration in which the check valve 52, 62, or 72 is provided in the hole 51 as the liquid-inflow prevention unit that suppresses inflow of the cooling water 32 into the inner space from outside of the pressure equalization pipe 50 has been described; however, another configuration can be adopted as the liquid-inflow prevention unit. According to this configuration, as illustrated in FIG. 15, a breathable waterproof membrane (membrane member, liquid-inflow prevention unit) 82 that allows circulation of gas but prevents circulation of liquid is arranged at an open end of the hole 51. The breathable waterproof membrane 82 is a porous filter having water resistance and breathability. By arranging the breathable waterproof membrane 82 at the open end of the hole 51, air can be discharged from the inside to outside of the pressure equalization pipe 50, and inflow of the cooling water 32 from the outside to inside of the pressure equalization pipe 50 can be prevented. Accordingly, water injection with a required flow rate to the nuclear reactor 5 can be performed, without degrading the effect of offsetting the pressure difference by the pressure equalization pipe 50. Further, because the breathable waterproof membrane 82 only needs to be arranged at the open end of the hole 51, a mechanism of discharging air from the inside to outside of the pressure equalization pipe 50 and preventing inflow of the cooling water 32 from the outside to inside of the pressure equalization pipe 50 can be easily formed.

As described above, according to the flow damper 34 of the present embodiment, the flow damper 34 is configured to include the cylindrical vortex chamber 35, the small flow-rate pipe 37 connected to a peripheral plate (peripheral edge) 35C of the vortex chamber 35 along the tangential direction thereof, the large flow-rate pipe 36 connected to the peripheral plate 35C with a predetermined angle with respect to the small flow-rate pipe 37, the outlet pipe 38 connected to the outlet 39 formed in the central part of the vortex chamber 35, and the pressure equalization pipe 50 with respective ends 50A being connected to the peripheral plate 35C at positions closer to the connection portion between the small flow-rate pipe 37 and the large flow-rate pipe 35 than the positions facing each other, putting the outlet 39 therebetween. The pressure equalization pipe 50 is arranged such that at least a part thereof is located at a position higher than the top plate 35A of the vortex chamber 35. Therefore, air (gas) flowing into the vortex chamber 35 can be collected in the pressure equalization pipe 50. Further, because the outgassing hole 51 is provided at the uppermost part 50D of the pressure equalization pipe 50, the collected air flows out through the hole 51. As a result, the effect of offsetting the pressure difference by the pressure equalization pipe 50 can be acquired sufficiently, and water injection with a required flow rate can be performed to the nuclear reactor 5.

Further, according to the present embodiment, because the pressure equalization pipe 50 is arranged to pass above the top plate 35A of the vortex chamber 35, it is possible to prevent that the pressure equalization pipe 50 passing the sides of the peripheral plate 35C or below the bottom plate 35B of the vortex chamber 35. Therefore, for example, when arranging the flow damper 34 in the airtight container 31 of the pressure accumulation and water-injection apparatus 30, interference between the pressure equalization pipe 50 and the bottom end plate 31C of the airtight container 31 can be suppressed, and the flow damper 34 can be arranged at the lowest position of the airtight container 31. Accordingly, water stored in the airtight container 31 can be used effectively for water injection without wasting the water.

According to the present embodiment, because the pressure equalization pipe 50 includes the check valve 52, 62, or 72 (liquid-inflow prevention unit) that suppresses inflow of the cooling water (liquid) into the inner space from outside of the pressure equalization pipe 50 and the breathable waterproof membrane (liquid-inflow prevention membrane member, membrane member) 82 in the hole 51, for example, when water injection to the nuclear reactor 5 is performed from the flow damper 34 through the outlet pipe 33, it is possible to prevent that the cooling water (liquid) in the airtight container 31 flowing into the inner space of the pressure equalization pipe 50 through the hole 51. Therefore, water injection with a required flow rate can be performed without degrading the effect of offsetting the pressure difference by the pressure equalization pipe 50.

According to the present embodiment, the check valves 52, 62, 72 respectively include the valve elements 52A, 62A, 72A that close the hole 51 by the liquid, flow from outside of the pressure equalization pipe 50 to the inner space. Accordingly, power for activating these valve elements 52A, 62A, and 72A is not required, and inflow of liquid from outside of the pressure equalization pipe 50 to the inner space can be prevented with a simple configuration.

Further, according to the present embodiment, because the breathable waterproof membrane 82 is arranged at the open end of the hole 51, air accumulated in the pressure equalization pipe 50 can be caused to flow out, and inflow of the cooling water from outside of the pressure equalization pipe 50 to the inner space can be prevented with a simple configuration.

The pressure-accumulation and water-injection apparatus 30 according to the present embodiment includes the airtight container 31 capable of storing the cooling water 32 in a pressurized state, and the flow damper 34 is arranged in the airtight container 31 in a mode in which the outlet pipe 38 is pulled outside of the airtight container 31. Therefore, when storing cooling water in the airtight container 31 in a pressurized state, even if air is mixed in the vortex chamber 35 of the flow damper 34, the air can be collected in the pressure equalization pipe 50. Further, because the outgassing hole 51 is provided in the uppermost part 50D of the pressure equalization pipe 50, the collected air can flow to outside through the hole 51. As a result, the effect of offsetting the pressure difference by the pressure equalization pipe 50 can be acquired sufficiently, and water injection can be performed with a required flow rate.

Further, in the nuclear installation 1 of the present embodiment, the nuclear installation 1 generates a high-temperature fluid by heat generated in the nuclear reactor 5, feeds the high-temperature fluid through the coolant pipes 6a and 6b, and uses the high-temperature fluid therein. The outlet pipe 38 pulled out to the outside of the airtight container 31 in the pressure-accumulation and water-injection apparatus 30 described above is connected to the middle of the coolant pipe 6a leading to the nuclear reactor 5, and the check valve 40 (or an on-off valve) is provided in the middle of the outlet pipe 38. Therefore, when water injection to the nuclear reactor 5 is required, and the cooling water stored in the airtight container 31 in a pressurized state is injected to the outside of the airtight container 31 from the outlet pipe 38 via the flow damper 34, even if air is mixed in the vortex chamber 35 of the flow damper 34, the air can be collected in the pressure equalization pipe 50. Further, because the outgassing hole 51 is provided in the uppermost part 50D of the pressure equalization pipe 50, the collected air flows out to the outside through the hole 51. As a result, the effect of offsetting the pressure difference by the pressure equalization pipe 50 can be acquired sufficiently, and water injection can be performed with a required flow rate.

While an embodiment of the present invention has been described above, the present invention is not limited to the embodiment. For example, in the embodiment described above, the pressure equalization pipe 50 is arranged to pass above the top plate 35A of the vortex chamber 35 of the flow damper 34 as viewed in a plan view. However, so long as at least a part of the pressure equalization pipe 50 is located at a position higher than the top plate 35A of the vortex chamber 35, the pressure equalization pipe 50 can be arranged at a position shifted from the top plate 35A of the vortex chamber 35 as viewed in a plan view. Further, in the embodiment described above, the pressure equalization pipe 50 includes the second piping portions 50C, and these second piping portions 50C are gradually inclined upward and the coupling portion of the second piping portions 50C, 50C is set to be the uppermost part 50D. However, the configuration can be such that the second piping portions 50C are provided horizontally and the hole is respectively provided at opposite ends of the horizontal portion. According to this configuration, when the flow damper 34 is arranged in the airtight container 31, even if the flow damper 34 is arranged with a slight inclination, air can be reliably discharged from the pressure equalization pipe through any of the holes.

REFERENCE SIGNS LIST 1 nuclear installation
5 nuclear reactor
6a cold leg (coolant pipe)
6b hot leg (coolant pipe)
6c crossover leg (coolant pipe)
30 pressure-accumulation and water-injection apparatus
31 airtight container
32 cooling water
34 flow damper
35 vortex chamber
36 large flow-rate pipe (second inlet pipe)
37 small flow-rate pipe (first inlet pipe)
38 outlet pipe
39 outlet
50 pressure equalization pipe
51 hole
52, 62, 72 check valve (liquid-inflow prevention unit)
52A, 62A, 72A valve element
82 breathable waterproof membrane (liquid-inflow prevention unit, membrane member)

The invention claimed is:

1. A flow damper comprising:
a cylindrical vortex chamber;
a first inlet pipe connected to a peripheral edge of the vortex chamber along a tangential direction thereof;
a second inlet pipe connected to the peripheral edge with a predetermined angle with respect to the first inlet pipe;
an outlet pipe connected to an outlet formed in a central part of the vortex chamber; and
a pressure equalization pipe that has a first end connected at a first point on the peripheral edge and a second end connected at a second point on the peripheral edge, wherein the first point and the second point define a chord of the peripheral edge and are on opposite sides of the outlet,
wherein the pressure equalization pipe is arranged such that at least a part of the pressure equalization pipe is located at a higher position than a top surface of the vortex chamber, and an outgassing hole is provided at an uppermost part of the pressure equalization pipe.

2. The flow damper according to claim 1, wherein the pressure equalization pipe includes a liquid-inflow prevention unit configured to suppress inflow of liquid through the hole to an interior of the pressure equalization pipe.

3. The flow damper according to claim 2, wherein the liquid-inflow prevention unit is a check valve including a valve element that closes the hole and prevents flow of liquid through the hole from an exterior to an interior of the pressure equalization pipe.

4. The flow damper according to claim 2, wherein the liquid-inflow prevention unit is a gas-permeable membrane configured to allow gas to pass through the hole while preventing liquid flow from an exterior to an interior of the pressure equalization pipe.

5. A pressure-accumulation and water-injection apparatus comprising:
an airtight container containing pressurized cooling water; and
the flow damper according to claim 1,
wherein the flow damper is arranged within the airtight container with the outlet pipe passing from an interior to an exterior of the airtight container.

6. A nuclear installation that generates a high-temperature fluid by heat generated in a nuclear reactor, comprising:
a coolant pipe providing coolant to the nuclear reactor; and
the pressure-accumulation and water-injection device of claim 5, wherein
an exterior end of the outlet pipe is connected to the coolant pipe and a valve is provided in the outlet pipe between the airtight container and the coolant pipe.

* * * * *